United States Patent
Wirrer et al.

(10) Patent No.: US 11,544,103 B2
(45) Date of Patent: Jan. 3, 2023

(54) DATA PROCESSING DEVICE AND METHOD FOR PROCESSING AN INTERRUPT

(71) Applicant: Infineon Technologies AG, Neubiberg (DE)

(72) Inventors: Gerhard Wirrer, Schliersee (DE); Frank Hellwig, Wunstorf (DE); Varun Kumar, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 22 days.

(21) Appl. No.: 17/038,183

(22) Filed: Sep. 30, 2020

(65) Prior Publication Data

US 2021/0103464 A1 Apr. 8, 2021

(30) Foreign Application Priority Data

Oct. 7, 2019 (DE) .................... 10 2019 126 897.4

(51) Int. Cl.
| | |
|---|---|
| *G06F 9/48* | (2006.01) |
| *G06F 9/30* | (2018.01) |
| *G06F 9/54* | (2006.01) |
| *G06F 9/455* | (2018.01) |
| *G06F 9/32* | (2018.01) |

(52) U.S. Cl.
CPC ........ *G06F 9/4812* (2013.01); *G06F 9/30101* (2013.01); *G06F 9/327* (2013.01); *G06F 9/45558* (2013.01); *G06F 9/546* (2013.01); *G06F 2009/45562* (2013.01)

(58) Field of Classification Search
CPC .... G06F 9/4812; G06F 9/30101; G06F 9/327; G06F 9/45558; G06F 9/546
See application file for complete search history.

(56) References Cited

U.S. PATENT DOCUMENTS

| | | | |
|---|---|---|---|
| 5,778,242 A | 7/1998 | Wang | |
| 7,200,144 B2* | 4/2007 | Terrell | ................ H04L 45/586 370/392 |
| 8,519,491 B2* | 8/2013 | Wang | .................... G01L 9/0073 257/419 |
| 10,248,595 B2* | 4/2019 | Hellwig | ................ G06F 9/4818 |
| 11,243,791 B2* | 2/2022 | Raisch | ................ G06F 9/45545 |
| 2007/0157197 A1* | 7/2007 | Neiger | ................ G06F 9/45533 718/1 |

(Continued)

*Primary Examiner* — Henry Tsai
*Assistant Examiner* — Christopher A Daley
(74) *Attorney, Agent, or Firm* — Eschweiler & Potashnik, LLC

(57) ABSTRACT

A data processing device is described including one or more processors implementing a plurality of data processing entities, one or more software interrupt nodes and an access register for each software interrupt node. The access register specifies which one or more data processing entities of the plurality of data processing entities is/are each allowed to, as interrupt source data processing entity, trigger an interrupt service request on the software interrupt node for another one of the plurality of data processing entities as an interrupt target processing entity. Each software interrupt node is configured to forward an interrupt service request triggered by an interrupt source data processing entity which is allowed to trigger an interrupt service request on the software interrupt node to an interrupt target processing entity.

14 Claims, 7 Drawing Sheets

(56) References Cited

U.S. PATENT DOCUMENTS

| | | | |
|---|---|---|---|
| 2014/0047150 A1* | 2/2014 | Marietta | G06F 9/5077 |
| | | | 710/264 |
| 2015/0212955 A1 | 7/2015 | Easwaran | |
| 2019/0222645 A1* | 7/2019 | Hellwig | G06F 9/45558 |
| 2020/0125397 A1* | 4/2020 | Wu | G06F 9/4812 |

* cited by examiner

FIG 3

Service Request Control Register i

SRCi (i=0-1023)
Service Request Control Register i           $(00000_H + i*4)$           Debug Reset Value: 0000 0000$_H$

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| 0 | SWSCLR | SWS | IOVCLR | IOV | SETR | CLRR | SRR | SRE | 0 | ECC | | | | | |
| r | w | rh | w | rh | w | w | rh | rw | r | rwh | | | | | |
| 15 | 14 | 13 | 12 | 11 | 10 | 9 | 8 | 7 | 6 | 5 | 4 | 3 | 2 | 1 | 0 |
| TOS | | 0 | VM | 0 | SRPN | | | | | | | | | | |
| rw | | r | rw | r | rw | | | | | | | | | | |

300

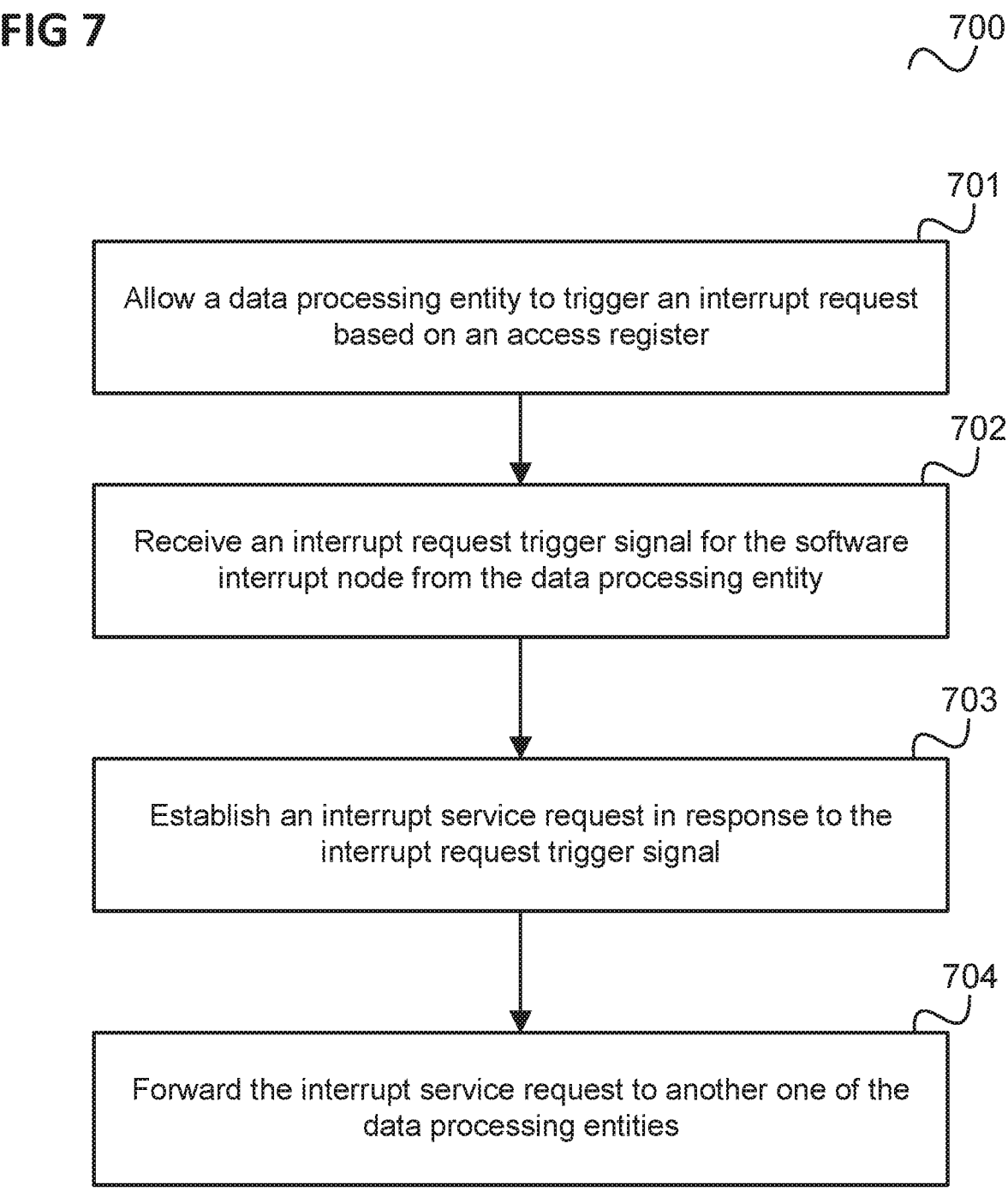

DATA PROCESSING DEVICE AND METHOD FOR PROCESSING AN INTERRUPT

REFERENCE TO RELATED APPLICATION

This application claims priority to German Application No. 10 2019 126 897.4, filed on Oct. 7, 2019, the contents of which are hereby incorporated by reference in their entirety.

FIELD

The present disclosure relates to data processing devices and methods for processing an interrupt.

BACKGROUND

The processing of interrupts is a typical functionality in a data processing system such as a computer or microcontroller. With an increasing number of data processing entities in a data processing system, e.g. multiple processors (CPUs), tasks and virtual machines, the requirements regarding the distribution of interrupt requests or triggers to interrupt handling entities (also referred to as interrupt service providers) increase accordingly. Since the hardware requirements of interrupt handling should nevertheless be kept low, efficient and flexible approaches for interrupt processing are desirable.

SUMMARY

According to various embodiments, a data processing device is provided including one or more processors implementing a plurality of data processing entities, one or more software interrupt nodes and an access register for each software interrupt node. The access register specifies which one or more data processing entities of the plurality of data processing entities is/are each allowed to, as an interrupt source data processing entity, trigger an interrupt service request on the software interrupt node for another one of the plurality of data processing entities as an interrupt target processing entity. Each software interrupt node is configured to forward an interrupt service request triggered by an interrupt source data processing entity which is allowed to trigger an interrupt service request on the software interrupt node to an interrupt target processing entity.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects are described with reference to the following drawings, in which:

FIG. 3 shows a service request control (SRC) register.

FIG. 7 shows a flow diagram illustrating a method for processing an interrupt according to an embodiment.

DETAILED DESCRIPTION

The following detailed description refers to the accompanying drawings that show, by way of illustration, specific details and aspects of this disclosure in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

Figure 1:
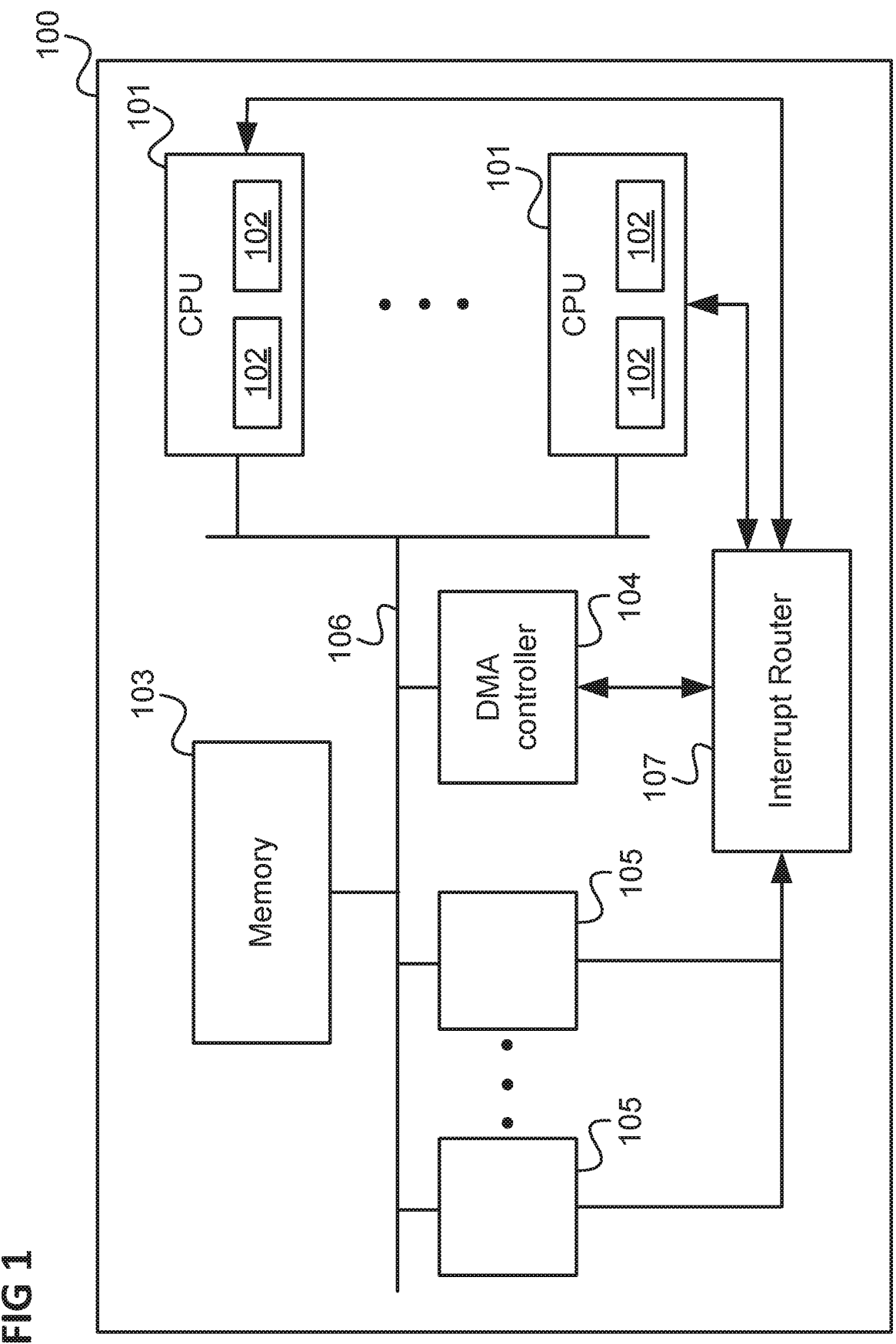
FIG. 1 shows a data processing device according to various embodiments.

FIG. 1 shows a data processing device 100 according to various embodiments.

The data processing device 100 includes one or more CPUs (Central Processing Units) 101 wherein each CPU 101 may have one or more CPU cores 102.

The data processing device 100 further includes a system memory 103, e.g. a RAM (random access memory) and a DMA (Direct Memory Access) controller 104.

Peripherals 105 of the data processing device 100, such as I/O (input output) devices like a graphics card, a sound card or a network card, may access the system memory 103 directly (i.e. without going via a CPU 101).

The CPUs 101, the system memory 103, the DMA controller 104 and the peripherals 105 may be connected via a computer bus (or computer bus system including multiple computer busses) 106.

A computer system like data processing device 100 typically supports interrupts. An interrupt is a signal emitted by hardware or software indicating an event that needs immediate attention, i.e. should be processed with priority over other tasks, i.e. should interrupt other tasks.

For handling interrupts, the data processing system 100 includes an interrupt router 107. The interrupt router 107 is connected with possible sources of interrupts (e.g. components that may trigger an interrupt) and components for processing (handling) an interrupt, wherein a component may act as both (such as a CPU 101). In the example of FIG. 1, the interrupt router 107 is connected with the CPUs 101, the DMA controller 104 and the peripherals 105.

Figure 2:
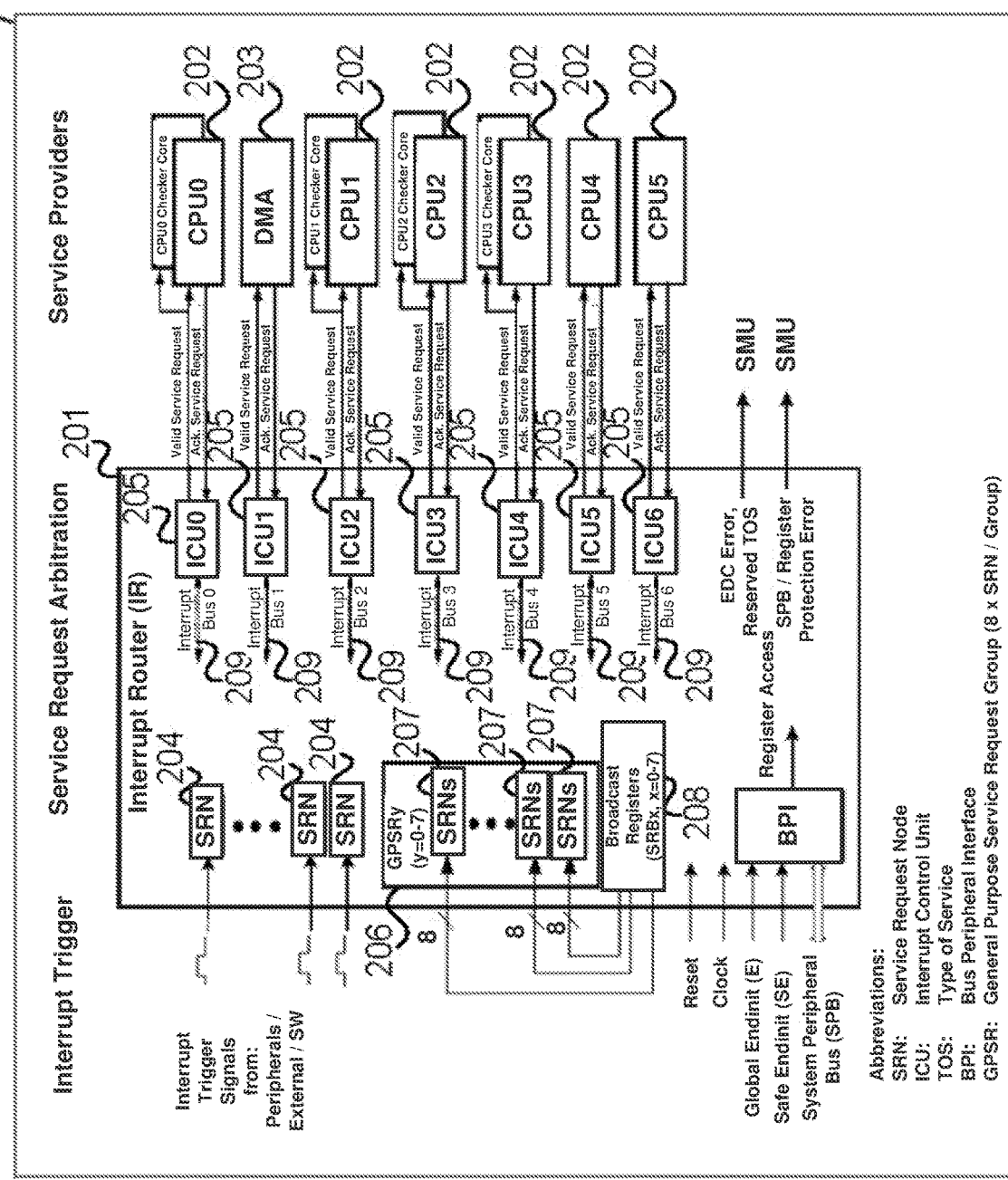
FIG. 2 shows an interrupt system.

FIG. 2 shows an interrupt system 200.

The interrupt system 200 includes an interrupt router 201, for example corresponding to interrupt router 107. Further, the interrupt system 200 includes CPUs 202, for example corresponding to CPUs 101, and a DMA controller 203, for example corresponding to DMA controller 104, as interrupt service providers.

The interrupt router 201 converts a software interrupt request (e.g. coming from one of CPUs 101) and a hardware interrupt request (e.g. coming from one of peripherals 105) into a pending service request (SR) by adding configurable information. This information for example includes information about to which interrupt service provider 202, 203 the service request should be forwarded and a priority of the service request. A pending service request is forwarded (by the interrupt router 201) to and serviced by one of the implemented interrupt service providers (ISPs, e.g. CPUs 202 and DMA 203).

The interrupt router 201 (e.g. in the form of an interrupt router module) includes service request nodes (SRNs) 204, interrupt control Units (ICUs) 205 and additional functionality for SW development support.

The service request nodes (SRNs) receive interrupt requests (or interrupt triggers) from an interrupt (request) source such as a peripheral 105 or a CPU 101. Each SRN contains a service request control register (SRC) to configure a service request (for an incoming interrupt request) regarding priority and mapping to one of the available interrupt service providers 202, 203.

The interrupt router further includes one or more general purpose service request node (GPRS) groups 206 that can be used for software (SW) triggered service requests (e.g. triggered by software running on one of CPUs 101). Each GPSR group 106 includes multiple service request nodes (SRNs) 207, e.g. eight SRN per GPSR group 106.

Additionally, there is a broadcast register 208 for each GPSR group 206 which enables software to trigger multiple SRNs 207 of the related GPSR group 206 with one software write access.

The interrupt router 201 has a dedicated interrupt control unit (ICU) 205 for each physical interrupt service provider (in this example CPUs 202 and DMA 203).

For each ISP 202, 203, the interrupt router 201 arbitrates among all pending service requests mapped to that ISP 202, 203, identifies the pending service request with the highest priority as the arbitration round winner and passes the current arbitration round winner to the respective ICU 205 (corresponding to the ISP 202, 203) via a respective interrupt arbitration bus 209.

The ICU 205 signals the latest valid winning service request to the ISP 202, 203. The ISP 202, 203 signals back to the ICU 205 if it has taken a service request for further processing.

Each service request node (SRN) 204 inside the interrupt router module 201 contains a service request control (SRC) register and interface logic that connects it to the interrupt triggering unit outside the interrupt router module 201 and to the interrupt arbitration buses 209 inside the interrupt router 201.

FIG. 3 shows a service request control (SRC) register 300.

In one embodiment, the SRC register 300 has a size of 32 bits and includes, in the order of ascending bit numbers, the following information Service Request Priority Number (SRPN)
Service Request Virtual Machine Number (VM) which allows mapping a service request to a virtual machine
Service request destination/service provider (TOS for "type of service") which allows mapping a service request to an interrupt service provider (e.g. CPU or DMA)
Error Correction Code (ECC) bits
Enable/disable information (SRE)
Service Request Status bit (SRR)
Service Request Set bit and Service Request Clear bit (SETR, CLRR)
Interrupt Overflow bit (IOV) and interrupt Overflow clear bit (IOVCLR)
Software Sticky Bit (SWS) as indication of an Software initiated service request (SWS) and Software Sticky clear bit (SWSCLR)

The interrupt router module 201 may provide multiple groups of General Purpose service request nodes (GPSR) 206 and a mechanism to trigger multiple service requests nodes of a GPSR group 206 in parallel, by software. General Purpose service request nodes are intended for Software interrupts because they are not mapped to hardware interrupt trigger events.

As mentioned above, there is one service request broadcast register 208 (SRBx) (denoted by SRBx for, e.g. x=0-7) implemented for each general purpose service request group, as illustrated in FIG. 2. In the following, the SRNs 207 of a GPSR 206 are denoted by GPSRxy, with x denoting the GPRS group and y (e.g. y=0-7) denoting the SRN 207 of the GPRS group 206). The service broadcast registers 208 can be used to set service requests to multiple interrupt service providers 202, 203 in parallel.

A service request broadcast register (SRBx) 208 can be used to trigger multiple service requests within the GPSR group in parallel (e.g. access multiple SRCs of the GPSR group in parallel).

Multicore Architectures with CPUs with hypervisor support lead to high flexibility requirements of the interrupt system used. This is, because each CPU 102 in Hypervisor Mode can represent multiple Virtual Machines where each active VM requires software interrupt capabilities for the communication with other VMs and CPUs or CPU cores.

Adding a group of software interrupt nodes (like a GPSR group) for each possible Virtual Machine on each implemented CPU core 102 would greatly increase the complexity and cost of the interrupt router 107.

In view of the above, according to various embodiments, a flexible software interrupt mechanism for Hypervisor support is provided which provides (at least one or some of) the following features per software interrupt node (e.g. SRN 207):

It can be assigned to an interrupt service provider (e.g. CPU a, Virtual Machine b, Task c)
It can be assigned to one or multiple SW interrupt sources (e.g. CPU a, Virtual Machine b, Task c)
It is protected against usage by unassigned SW interrupt sources.
Since the number of SW interrupt nodes in the system 200 is limited, a SW interrupt node supports the transmission of additional information from the SW interrupt source to the respective ISP.
To protect the information transmitted via SW interrupt against early/unintentional overwriting by the (or another) SW interrupt source, a handshake mechanism is provided.
Multiple SW interrupt sources are able to trigger an individual SW interrupt node.

Specifically, according to various embodiments, (at least one or some of) the following features are provided for each GPSRxy (generally Software interrupt node, which may also be referred to as a Software interrupt service node):

Configuration which software interrupt source(s) (e.g. which CPU, which virtual machine, which software task) can trigger a software interrupt by write access on the software interrupt node.
Configuration to which interrupt service provider (e.g. CPU a, VM b, DMA) a service request is to be forwarded.
a mailbox register to transfer additional information from a software interrupt source to the respective ISP.
a handshake mechanism to protect the mailbox register information (i.e. the information stored in the mailbox register) from being overwritten too early (e.g. by an assigned interrupt source before the interrupt service provider consumes the information).
the configured SW interrupt Source(s) can trigger a service request by writing to the mailbox register.
a write to the mailbox register blocks it against being overwritten (status bit shows the state of the blockade).
only the currently configured interrupt service provider (i.e. for which the mailbox register information is intended) can unblock the mailbox register by writing into the mailbox register
writing to an unlock bit in a software interrupt control (SWC) register
reading the mailbox register.

In the following, an example for an implementation of the above-mentioned software interrupt node is described with reference to FIG. 4.

Figure 4:
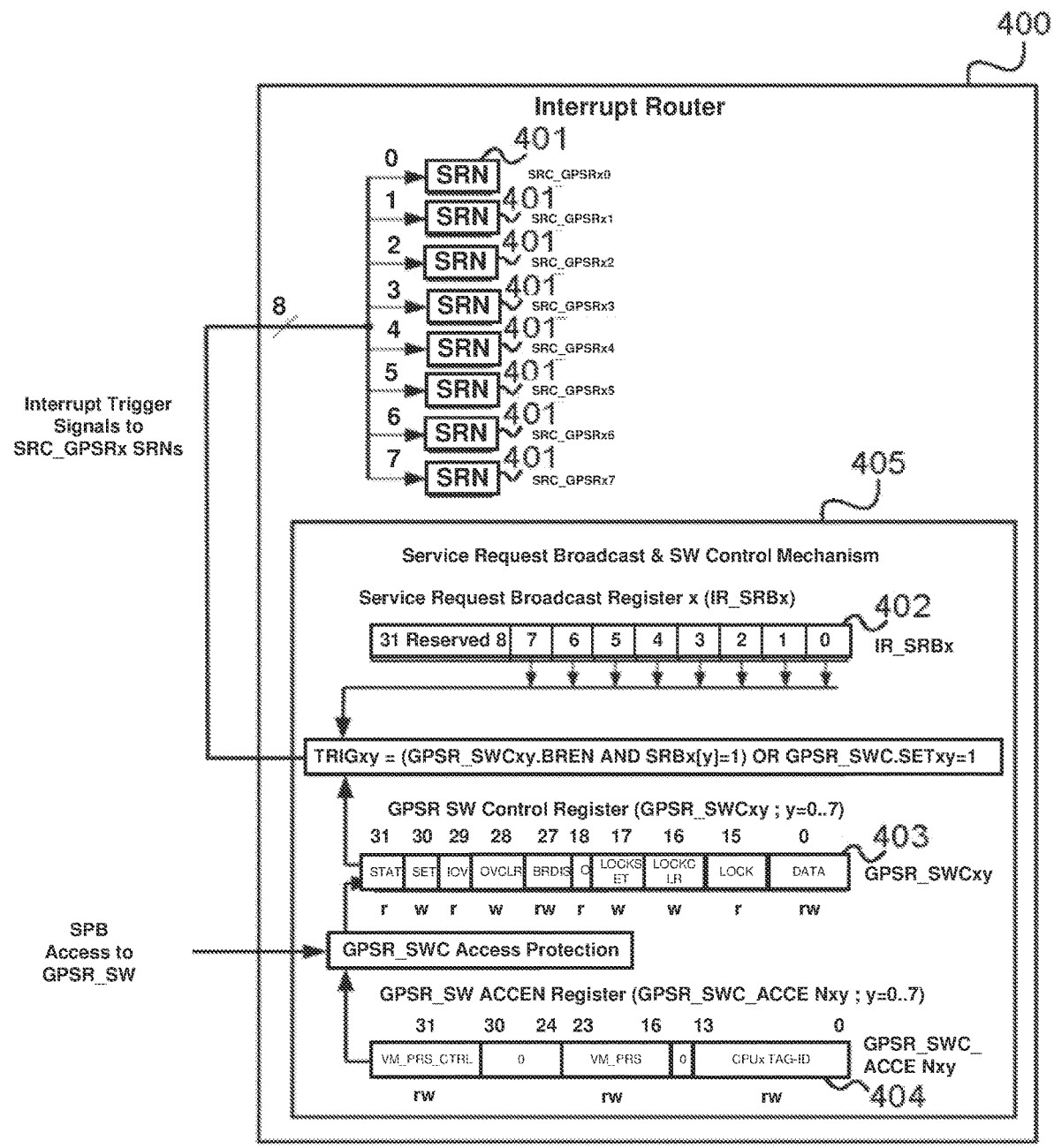
FIG. 4 shows an interrupt router according to an embodiment.

FIG. 4 shows an interrupt router 400 according to an embodiment.

The interrupt router 400 is for example part of an interrupt system 200 as described with reference to FIG. 2. The interrupt router 400 may in particular include components similarly to the interrupt router 200 which are omitted in FIG. 4 for simplicity, such as hardware interrupt service request nodes, ICUs and interrupt busses.

The interrupt router 400 includes a GPSR group. The GPSR group may be part of a plurality of similar GPSR groups and is therefore denoted as GPSRx. The GPSR group includes service request nodes 401, each denoted by GPSRxy (wherein y=0, . . . , 7 in the example of FIG. 4).

Similar to the interrupt router 201, the interrupt router 400 includes a (service request) broadcast register 402 for the GPSR group. It is denoted by IR_SRBx (for the GPSR group GPSRx).

In addition to the broadcast register 402, the interrupt router 400 includes two additional types of control registers 403, 404:

A GPSR software control register 403 for each software interrupt node, denoted as GPSR_SWCxy (for Software interrupt node GPSRxy). This register 403 enables one or more assigned software interrupt source(s) and the respective interrupt service provider to control the software interrupt node.

An access protection register 404 for each GPSR software control register 403, denoted as GPSR_SWC_ACCENxy (for GPSR software control register GPSR_SWCxy). This register 404 enables application software to assign the GPSR_SWCxy to one or multiple SW interrupt sources (e.g. CPU, Virtual Machine and SW Task).

In comparison to the broadcast register 402 (IR_SRBx), the GPSR software control registers (GPSR_SWCxy) offer more flexible and extended functions for setting and controlling SW interrupts.

The broadcast register 402, the GPSR Software control registers 403 and the access protection registers 404 provide a service request broadcast & software control mechanism 405.

A dedicated GPSR_SWCxy register 403 is provided for each GPSRxy 401. The GPSR software control register 403 for an GPSRxy 401 includes 32 bits and includes, in the order of ascending bit numbers, the fields DATA (read- and writable),
LOCK (readable),
LOCKCLR (writable),
LOCKSET (writable),
BRDIS (read- and writable),
IOVLCR (writable),
IOV (readable),
SET (writable) and
STAT (readable)
whose meaning is given in the following in context of the GPSR Software control functions:

Reading the service request Status (STAT) and interrupt overflow status (IOV) status of the GPSRxy Setting and resetting of a service request in the related GPSRxy (SET)

Reset of Interrupt Overflow (IOV) information in the related GPSRxy (IOVCLR)

Disabling the software broadcast trigger mechanism for GPSRxy to restrict GPSR control to GPSRxy (BRDIS for "Broadcast Disable")

Transferring of additional information from SW interrupt source to interrupt service provider (via mailbox bit field DATA)

Hardware handshake mechanism for the mailbox information (LOCK (allows reading the lock status), LOCKCLR (to clear the lock by assigned interrupt service provider), LOCKSET (to set the lock to prevent overwrite)).

The "readable" and the "writable" in the above list may for example refer to whether the various fields are readable or writable, respectively, by the interrupt sources and/or ISPs.

For each GPSR_SWCxy register 403 there is a corresponding GPSR_SWC_ACCENxy register 404 that enables application software to assign the control of each GPSR_SWCxy to software interrupt source(s) (e.g. CPU, Virtual Machine and software Task) while the control of the associated GPSRxy can be assigned via the GPSRxy.TOS configuration (i.e. the TOS field of the SRC register of GPSRxy, see FIG. 3) and/or GPSRxy.VM configuration (i.e. the VM field of the SRC register of GPSRxy, see FIG. 3) to a dedicated ISP (Service request provider).

The GPSR_SWC_ACCENxy register 404 includes 32 bits and includes, in the order of ascending bit numbers, the fields CPUz TAG-ID for each CPU 202 (or also DMA 203): allows enabling read and write access to the corresponding GPSR_SWCxy for the CPU with index z (may be included for multiple z)

VM_PRSj: allows enabling access to the corresponding GPSR_SWCxy for the virtual machine (or PRS (protection set)) with index j (may be included for multiple j)

VM_PRS_CTRL: this bit controls whether the VM_PRSj values are used for the VM check or for the PRS check. This means that VM_PRS_CTRL specifies whether the VM_PRSj specify the access rights for VMs or for PRSs. This allows saving register bits.

The GPSR_SWC Access Protection function includes:

Dedicated read/write access protection for each GPSR_SCWxy register

Enabling/disabling of Master Functions Tag IDs for access to the related GPSR_SWCxy (e.g. CPUz, DMA) by means of CPUz TAG-ID Enabling/disabling of VM or PRS encodings for read/write access to the related GPSR_SWCxy by means of VM_PRSj Both the service request broadcast register 302 and the GPSR_SWC register 403 may send interrupt trigger signals to GPRSxy (referred to as TRIGxy in FIG. 4).

Figure 5:
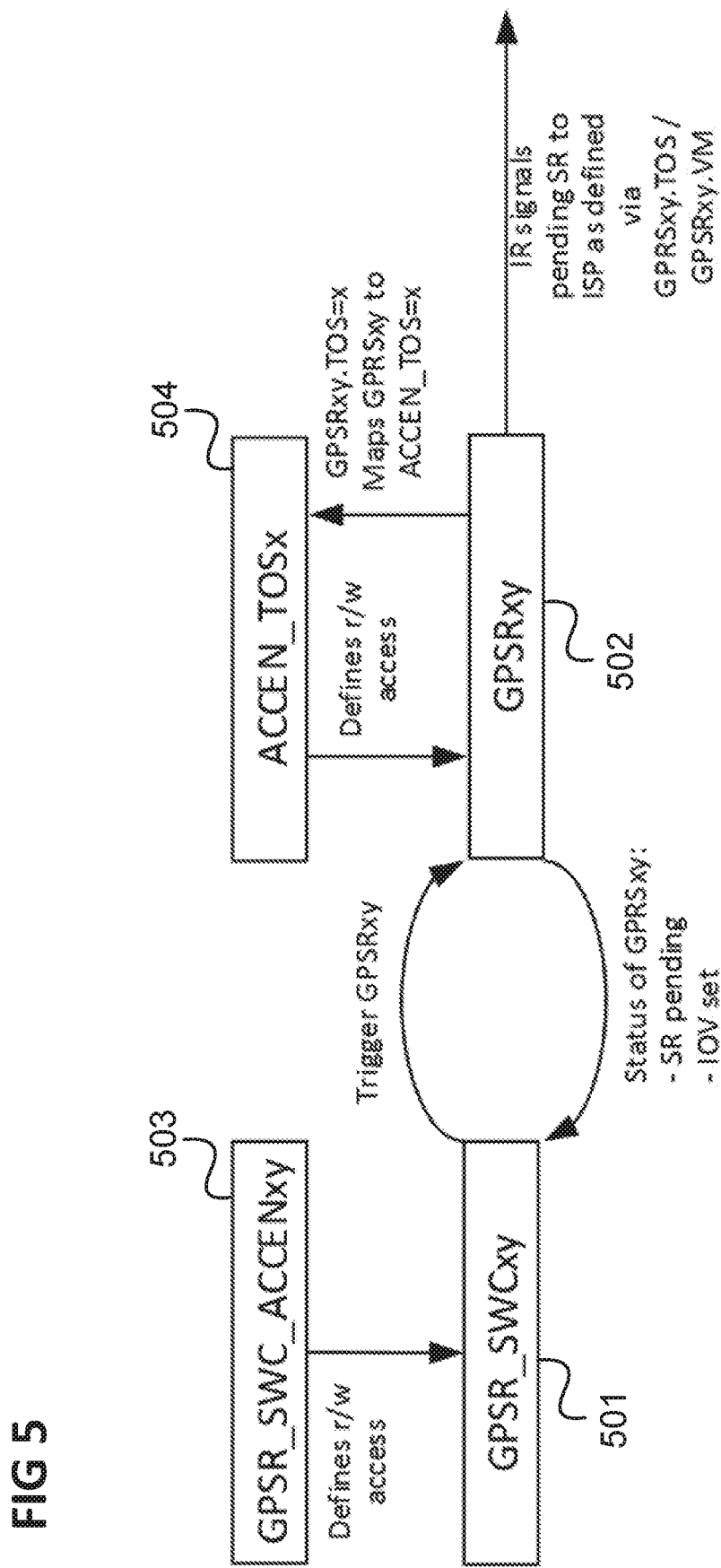
FIG. 5 illustrates the interaction of a GPSR_SWCxy register for a GPSRxy, the corresponding GPSR_SWC_ACCENxy register, and an ACCEN_TOSx register.

FIG. 5 illustrates the interaction of a GPSR_SWCxy register 501 for a GPSRxy 502, the corresponding GPSR_SWC_ACCENxy register 503, and an ACCEN_TOSx register 504.

The GPSR_SWCxy register 501 for example corresponds to GPSR_SWCxy register 403, the GPSR_SWC_ACCENxy register 503 for example corresponds to GPSR_SWC_ACCENxy register 404 and the GPSRxy 502 for example corresponds the GPSR 401 for which the GPSR_SWCxy register 403 is provided.

The GPSR_SWC_ACCENxy register 503 defines the read/write access to the GPSR_SWCxy 501 and thus defines which interrupt sources may trigger a software interrupt on GPSRxy 502 by writing to the SET field of GPSR_SWCxy

501. The GPSR_SWCxy 501 triggers an interrupt on GPSRxy 502 when written to accordingly (into the SET field) by an interrupt source. The GPSR_SWC_ACCENxy register 503 further defines which interrupt sources may write to (e.g. update) the mailbox (i.e. DATA field of GPSR_SWCxy 501).

The GPSR_SWCxy 501 may be read by the ISP (referred to as GPRSxy.TOS or GPSRxy.VM in case of a virtual machine) assigned to handle a triggered software interrupt. In particular, the ISP may read and unlock the mailbox (i.e. the DATA field of GPSR_SWCxy 501).

The status of GPSRxy 502 is indicated in the GPSR_SWCxy 501, namely whether GPSRxy 502 has a pending service request (STAT field is set) and whether it has an overflow (IOV field is set).

The ACCEN_TOSx register 504 (not shown in FIG. 4) defines which ISPs are associated with the GPSRxy 502. In particular, it defines read and write access to the GPSRxy 502. GSPRxy 502 is mapped to a certain ISP (TOS or VM). The ISP to which it is mapped defines the ISP to which the GPSRxy 502 sends an IR (interrupt request) signal, i.e. an interrupt service request, for a pending (interrupt) service request (i.e. to which ISP it forwards an interrupt service request triggered on the GPSRxy by an interrupt source).

Figure 6:
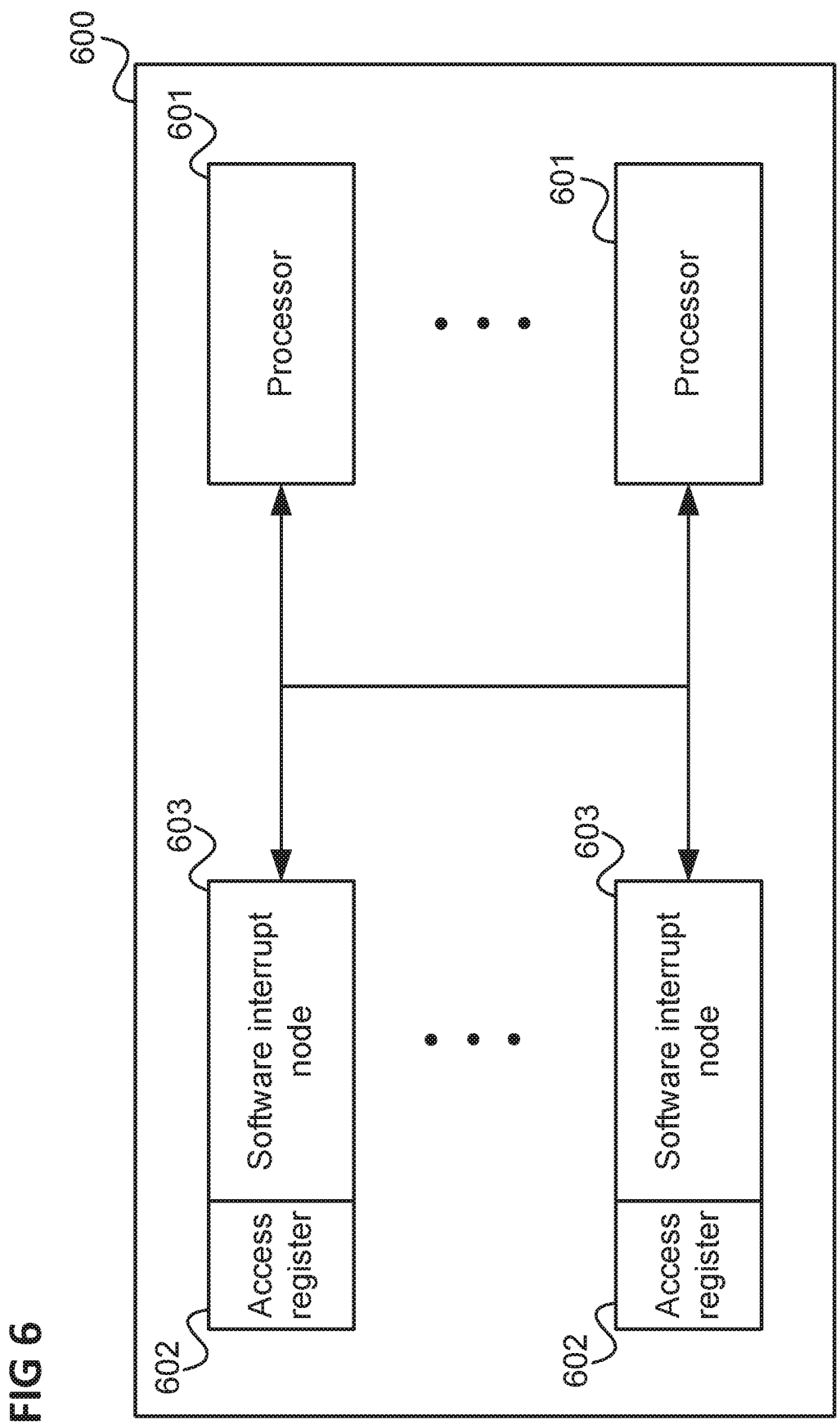
FIG. 6 shows a data processing device according to an embodiment.

In summary, according to various embodiments, a data processing device is provided as illustrated in FIG. 6.

FIG. 6 shows a data processing device 600 according to an embodiment.

The data processing device includes one or more processors 601 implementing a plurality of data processing entities and one or more software interrupt nodes 603.

Further, the data processing device includes an access register 602 for each software interrupt node 603 which specifies which one or more data processing entities of the plurality of data processing entities is/are each allowed to, as interrupt source data processing entity, trigger an interrupt service request on the software interrupt node for another one of the plurality of data processing entities as interrupt target processing entity.

Each software interrupt node 603 is configured to forward an interrupt service request triggered by an interrupt source data processing entity which is allowed to trigger an interrupt service request on the software interrupt node to an interrupt target processing entity.

According to various embodiments, in other words, a data processing device (e.g. a microcontroller) includes one or more software interrupt nodes on which an interrupt source data processing entity (e.g. a CPU, a CPU core, a task or a virtual machine) may trigger an interrupt service request. A software interrupt node on which an interrupt service request has been triggered (and which then has a pending interrupt service request) forwards (i.e. transmits) the interrupt service request to an interrupt target processing entity. For each software interrupt node 603 the corresponding access register 602, i.e. the access register provided for the software interrupt node 603 defines which one (or ones) of the software interrupt nodes may trigger interrupt service requests on (in other words, send interrupt trigger signals to) the software interrupt node.

For example, a comparator may be provided which is configured to compare an identification of a data processing entity sending an interrupt trigger to a software interrupt node to one or more allowed identifications (stored in the access register for the software interrupt node) and the software interrupt node is configured to generate an interrupt service request if the identification of the data processing entity sending the interrupt trigger matches (i.e. is) an allowed identification. For example, the comparator may be configured to set an enable signal if the identification of the data processing entity sending the interrupt trigger matches an allowed identification.

In the above examples, the GPSRxy can be seen as the software interrupt node and the corresponding GPSR_SWC_ACCENxy can be seen as the access register for the software interrupt node.

According to various examples, a hardware support for software interrupts is provided, wherein there is a configurable assignment of a software interrupt node to a software interrupt source. Further, interrupt service providers may be provided together with a mailbox feature and a handshake mechanism for the transferred mailbox information from interrupt source to interrupt service provider.

The data processing device for example carries out a method as illustrated in FIG. 7.

FIG. 7 shows a flow diagram 700 illustrating a method for processing an interrupt.

In 701, based on an access register, a data processing entity of a plurality of data processing entities implemented by one or more processors is allowed to trigger an interrupt request on a software interrupt node, wherein the access register which specifies which one or more data processing entities is/are each allowed to trigger an interrupt service request on the software interrupt node.

In 702, an interrupt request trigger signal for the software interrupt node is received from the data processing entity.

In 703, an interrupt service request is established in response to the interrupt request trigger signal.

In 704, the interrupt service request is forwarded to another one of the data processing entities.

Various Examples are described in the following:

Example 1 is a data processing device as illustrated in FIG. 6.

Example 2 is the data processing device of Example 1, wherein the one or more software interrupt nodes are nodes for receiving interrupt requests from the plurality of data processing entities, generating interrupt service requests for interrupt requests and forwarding the interrupt service requests to the plurality of data processing entities.

Example 3 is the data processing device of Example 1 or 2, further comprising, for each software interrupt node, access circuitry configured to control access to the software interrupt node for triggering interrupt service requests on the software interrupt node.

Example 4 is the data processing device of Example 3, wherein the access circuitry is configured to restrict access to the software interrupt node for triggering interrupt service requests on the software interrupt node to data processing entities specified by the access register for the software interrupt node as being allowed to trigger an interrupt service request on the software interrupt node.

Example 5 is the data processing device of any one of Examples 1 to 4, further comprising a message transmission register for each software interrupt node, configured to receive and store data to be transmitted from an interrupt source data processing entity to an interrupt target data processing entity.

Example 6 is the data processing device of Example 5, comprising a protection circuit configured to prevent overwriting of the message transmission register by another interrupt source data processing entity until the interrupt source data processing entity allows overwriting of the message transmission register.

Example 7 is the data processing device of any one of Examples 1 to 6, comprising an interrupt router comprising the one or more software interrupt nodes.

Example 8 is the data processing device of any one of Examples 1 to 7, comprising one or more processors, each processor having a plurality of processor cores.

Example 9 is the data processing device of Example 8, wherein at least some of the processor cores are each configured to implement a plurality of virtual machines.

Example 10 is the data processing device of any one of Examples 1 to 9, wherein the data processing entities comprise processors, processing cores, virtual machines implemented on one or more processors or processing cores and/or tasks implemented on one or more processors or processing cores.

Example 11 is the data processing device of any one of Examples 1 to 10, wherein for each software interrupt node, a plurality of data processing entities are is allowed to trigger an interrupt service request on the software interrupt node.

Example 12 is the data processing device of any one of Examples 1 to 11, further comprising a target register for each software interrupt node specifying the interrupt target processing entity for the software interrupt node.

Example 13 is the data processing device of Example 12, wherein the software interrupt node is configured to forward the interrupt service request to the interrupt target processing entity specified by the target register.

Example 14 is a method for processing an interrupt as illustrated in FIG. 7.

Example 15 is the method of Example 14, wherein the software interrupt node is one of one or more software interrupt nodes which are nodes for receiving interrupt requests from the plurality of data processing entities, generating interrupt service requests for interrupt requests and forwarding the interrupt service requests to the plurality of data processing entities.

Example 16 is the method of Example 14 or 15, further comprising controlling access to the software interrupt node for triggering interrupt service requests on the software interrupt node.

Example 17 is the method of Example 16, comprising restricting access to the software interrupt node for triggering interrupt service requests on the software interrupt node to data processing entities specified by the access register for the software interrupt node as being allowed to trigger an interrupt service request on the software interrupt node.

Example 18 is the method of any one of Examples 14 to 17, further receiving and storing data to be transmitted from an interrupt source data processing entity to an interrupt target data processing entity in a message transmission register.

Example 19 is the method of Example 18, comprising preventing overwriting of the message transmission register by another interrupt source data processing entity until the interrupt source data processing entity allows overwriting of the message transmission register.

Example 20 is the method of any one of Examples 14 to 19, wherein the software interrupt node is part of an interrupt router.

Example 21 is the method of any one of Examples 14 to 20, wherein each of the one or more processors has a plurality of processor cores.

Example 22 is the method of Example 21, wherein at least some of the processor cores implement a plurality of virtual machines.

Example 23 is the method of any one of Examples 14 to 22, wherein the data processing entities comprise processors, processing cores, virtual machines implemented on one or more processors or processing cores and/or tasks implemented on one or more processors or processing cores.

Example 24 is the method of any one of Examples 14 to 23, comprising allowing a plurality of data processing entities are to trigger an interrupt service request on the software interrupt node.

Example 25 is the method of any one of Examples 14 to 24, comprising specifying, by means of a target register for the software interrupt node, an interrupt target processing entity for the software interrupt node.

Example 26 is the method of Example 25, wherein the software interrupt node forwards the interrupt service request to the interrupt target processing entity specified by the target register.

According to a further example, a data processing device is provided including one or more service request nodes, wherein each service request node is configured to forward an interrupt request triggered by a data processing entity of the plurality of data processing entities to another data processing entity of the plurality of data processing entities and an access register for each service request node, wherein the access register specifies which data processing entity may trigger an interrupt request on the service request node.

According to a further example, a method for processing an interrupt is provided including a data processing entity of a plurality of data processing entities implemented by one or more processors transmitting an interrupt request signal to a software interrupt node, determining whether the data processing entity is allowed to, as interrupt source data processing entity, trigger an interrupt service request on the software interrupt node and forwarding the interrupt service request triggered by the data processing entity to another one of the plurality of data processing entities as interrupt target processing entity if the data processing entity is allowed to trigger an interrupt service request on the software interrupt node.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A data processing device comprising:
one or more processors implementing a plurality of data processing entities;
a plurality of software interrupt nodes; and
a plurality of access registers, wherein each access register is operably coupled to a respective one of the plurality of software interrupt nodes, and wherein each access register is configured to specify which one or more data processing entities of the plurality of data processing entities is respectively allowed to, as an interrupt source data processing entity, trigger an interrupt service request on the respective software interrupt node for another one of the plurality of data processing entities as an interrupt target processing entity; and
wherein each software interrupt node is configured to forward the interrupt service request triggered by the interrupt source data processing entity which is allowed to trigger the interrupt service request on the software interrupt node to the interrupt target processing entity.

2. The data processing device of claim 1, wherein the plurality of software interrupt nodes are nodes configured to receive the interrupt requests from the plurality of data processing entities, generate the interrupt service requests for the interrupt requests and forward the interrupt service requests to the plurality of data processing entities.

3. The data processing device of claim 1, further comprising, for each software interrupt node, access circuitry configured to control access to the software interrupt node for triggering interrupt service requests on the software interrupt node.

4. The data processing device of claim 3, wherein the access circuitry is configured to, on the software interrupt node to data processing entities specified by the access register for the software interrupt node, restrict access to the software interrupt node for triggering interrupt service requests.

5. The data processing device of claim 1, further comprising a message transmission register for each software interrupt node, the message transmission register configured to receive and store data to be transmitted from an interrupt source data processing entity to an interrupt target data processing entity.

6. The data processing device of claim 5, further comprising a protection circuit configured to prevent overwriting of the message transmission register by another interrupt source data processing entity until the interrupt source data processing entity allows overwriting of the message transmission register.

7. The data processing device of claim 1, further comprising an interrupt router comprising the plurality of software interrupt nodes.

8. The data processing device of claim 1, wherein each processor of the one or more processors has a plurality of processor cores.

9. The data processing device of claim 8, wherein at least some of the processor cores are each configured to implement a plurality of virtual machines.

10. The data processing device of claim 1, wherein the data processing entities comprise processing cores, virtual machines implemented on one or more processors or processing cores and/or tasks implemented on one or more processors or processing cores.

11. The data processing device of claim 1, wherein for each software interrupt node, a plurality of data processing entities are configured to trigger an interrupt service request on the software interrupt node.

12. The data processing device of claim 1, further comprising a target register for each software interrupt node, the target register configured to specify the interrupt target processing entity for the software interrupt node.

13. The data processing device of claim 12, wherein the software interrupt node is configured to forward the interrupt service request to the interrupt target processing entity specified by the target register.

14. A method for processing an interrupt, comprising:
allowing, based on a dedicated access register, a data processing entity of a plurality of data processing entities implemented by one or more processors to trigger an interrupt request on a software interrupt node, wherein the access register specifies which one or more data processing entities is allowed to trigger an interrupt service request on the software interrupt node for a plurality of software interrupt nodes and a plurality of dedicated access registers, wherein each of the dedicated access registers is operably coupled to one of the software interrupt nodes, respectively;
receiving the interrupt request trigger signal for the software interrupt node from the data processing entity having the access register;
establishing an interrupt service request in response to the received interrupt request trigger signal; and
forwarding the established interrupt service request to another one of the data processing entities.

* * * * *